(12) United States Patent
Nielson et al.

(10) Patent No.: US 7,477,812 B2
(45) Date of Patent: Jan. 13, 2009

(54) SYSTEM AND METHOD FOR PROVIDING FAST, LOW VOLTAGE INTEGRATED OPTICAL ELEMENTS

(75) Inventors: Gregory N. Nielson, Albuquerque, NM (US); George Barbastathis, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 489 days.

(21) Appl. No.: 11/110,511

(22) Filed: Apr. 20, 2005

(65) Prior Publication Data
US 2005/0271324 A1 Dec. 8, 2005

Related U.S. Application Data

(63) Continuation-in-part of application No. 10/979,706, filed on Nov. 2, 2004, now Pat. No. 7,250,837, and a continuation-in-part of application No. 10/979,350, filed on Nov. 2, 2004.

(60) Provisional application No. 60/564,799, filed on Apr. 23, 2004, provisional application No. 60/533,128, filed on Dec. 30, 2003, provisional application No. 60/533,127, filed on Dec. 30, 2003.

(51) Int. Cl.
*G02B 6/26* (2006.01)
(52) U.S. Cl. .......................... 385/16; 385/15
(58) Field of Classification Search ............ 385/15, 385/16
See application file for complete search history.

(56) References Cited

U.S. PATENT DOCUMENTS

| | | | |
|---|---|---|---|
| 6,665,476 B2 | 12/2003 | Braun et al. | |
| 6,718,083 B2 | 4/2004 | Lopes et al. | |
| 6,751,377 B2 * | 6/2004 | Baumann et al. | 385/32 |
| 6,839,479 B2 | 1/2005 | Berger et al. | |

(Continued)

FOREIGN PATENT DOCUMENTS

WO WO01/80266 10/2001

(Continued)

OTHER PUBLICATIONS

R. Soref, "Silicon-Based Optoelectronics," Proceedings of the IEEE, vol. 81, No. 12, Dec. 1993, pp. 1687-1706.

(Continued)

*Primary Examiner*—Jennifer Doan
(74) *Attorney, Agent, or Firm*—Gauthier & Connors LLP

(57) ABSTRACT

A switching system is disclosed for an optical signal. The switching system includes a first optical waveguide coupled to a first electrode, a second electrode, and a second optical waveguide. The second optical waveguide is coupled to a movable electrode. The movable electrode is supported by a support structure and is positioned with respect to the first and second electrodes so that the position of the movable electrode may be selectively placed in either a first closed state or a second open state defined by the first and second electrodes under application of a voltage with respect to one of the first and second electrodes. The first closed state provides that the first and second optical waveguides are sufficiently close to each other to provide optical coupling therebetween while the second open state provides that the first and second optical communication channels are not sufficiently close to each other to provide optical coupling therebetween, or provide some different amount of optical coupling than in the first closed state.

9 Claims, 6 Drawing Sheets

U.S. PATENT DOCUMENTS

| | | | |
|---|---|---|---|
| 6,842,563 B2* | 1/2005 | Zhang et al. | 385/24 |
| 2002/0031305 A1 | 3/2002 | Ticknor et al. | |
| 2002/0172466 A1 | 11/2002 | Baumann et al. | |
| 2003/0155995 A1 | 8/2003 | Iwata et al. | |
| 2003/0178913 A1 | 9/2003 | Norimatsu | |

OTHER PUBLICATIONS

R. Dangel & W. Lukosz, "Electro-nanomechanically actuated integrated-optical inferometric intensity modulators and 2X2 space switches," Optics Communications 156, 1998, pp. 63-76.

Bhalotra et al., "Parallel-plate MEMS Mirror Design for Large On-Resonance Displacement," IEEE, Aug. 2000, pp. 93-94.

Peroulis et al., "Electromechanical Considerations in developing Low-Voltage RF MEMS Switches," IEEE Transactions on Microwave Theory and Techniques, vol. 51, No. 1, Jan. 2003, pp. 259-270.

Robert et al., "Integrated RF-MEMS Switch Based on a Combination of Thermal and Electrostatic Actuation," Int'l Conference on Solid State Sensors, Actuators and Microsystems, Boston, Jun. 8-12, 2003, pp. 1714-1717.

Nielson et al., "MEMS based wavelength selective optical switching for integrated photonic circuits," Optical Society of America, 2003.

G. Reed, "The optical age of silicon," Nature, vol. 427, Feb. 12, 2004, pp. 595-596.

* cited by examiner

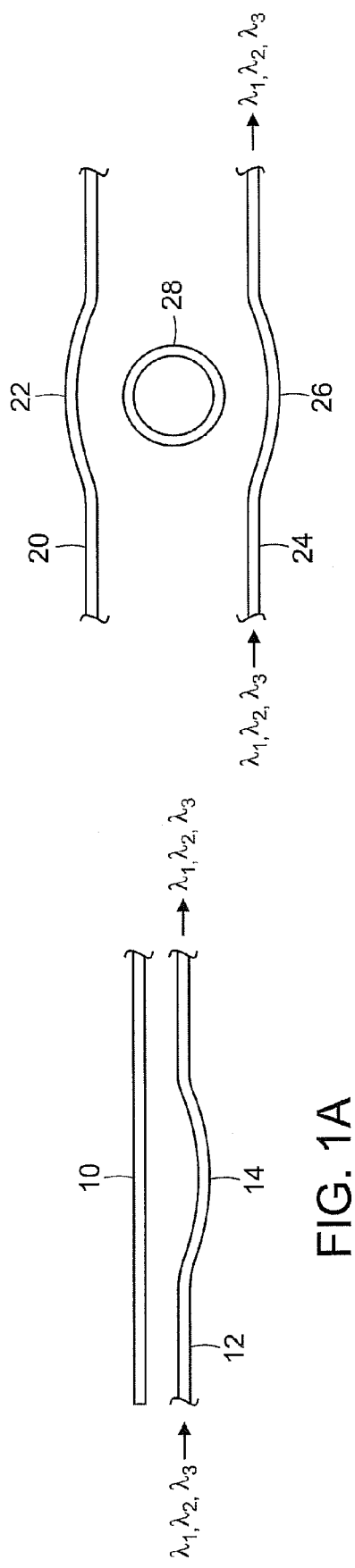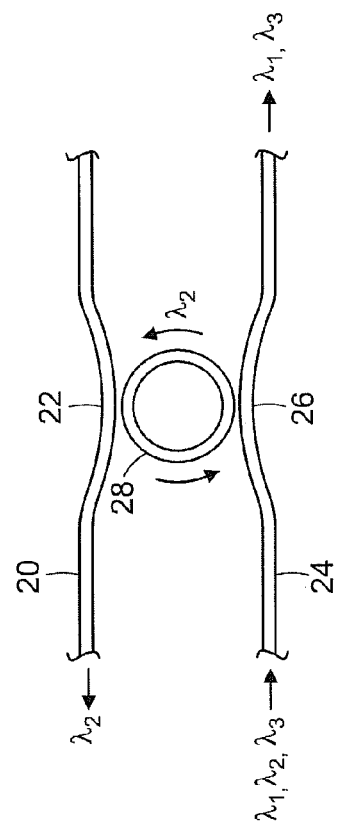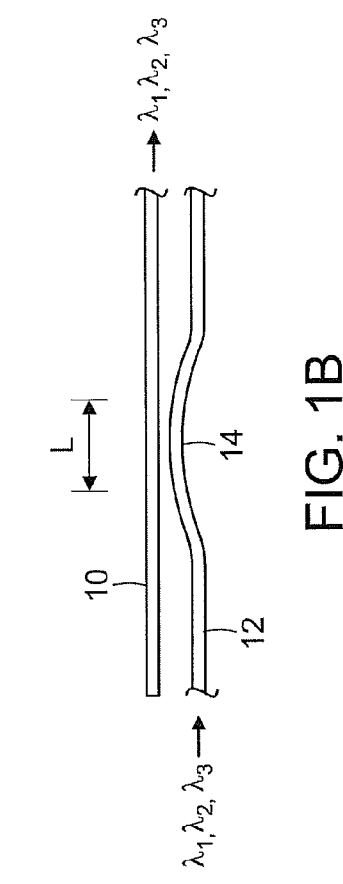

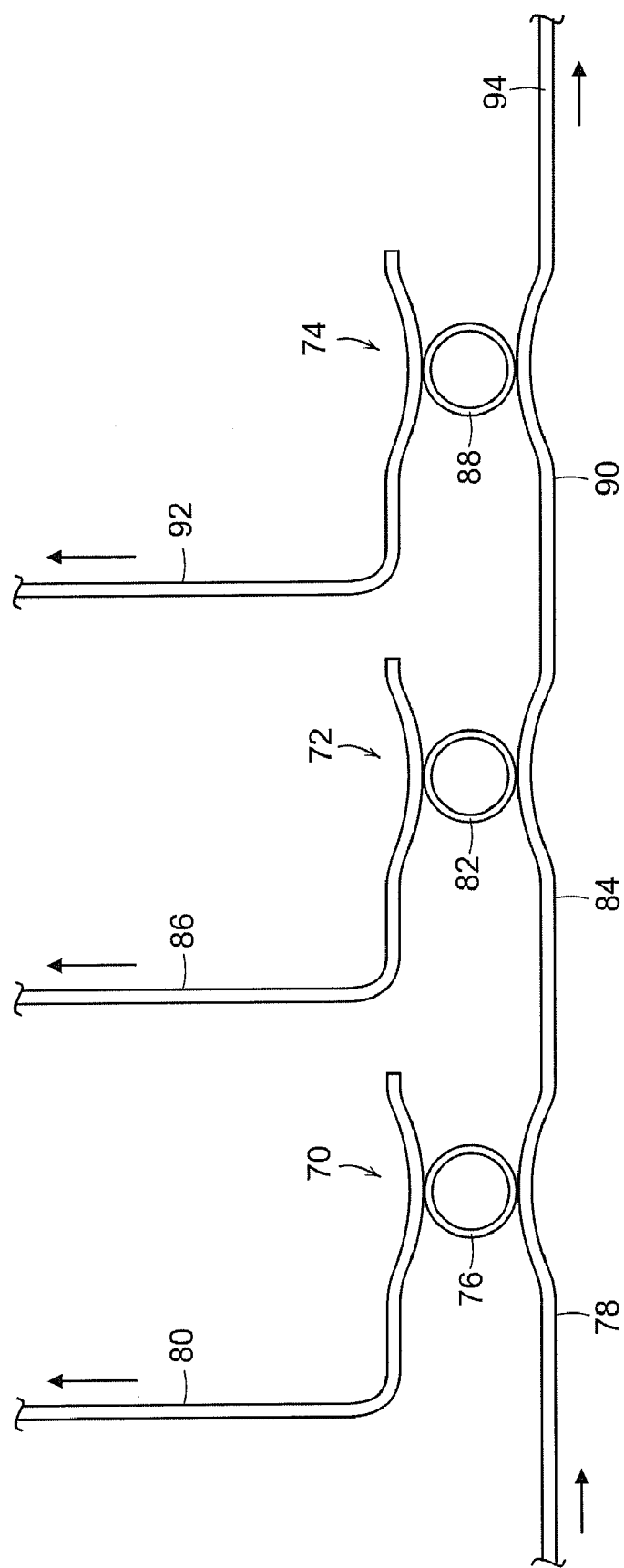

SYSTEM AND METHOD FOR PROVIDING FAST, LOW VOLTAGE INTEGRATED OPTICAL ELEMENTS

PRIORITY

This application claims priority to U.S. Provisional Application Ser. No. 60/564,799 filed Apr. 23, 2004, the disclosure of which is hereby incorporated by reference, and is a continuation-in-part application of U.S. patent application Ser. No. 10/979,706 filed Nov. 2, 2004 now U.S. Pat. No. 7,250,837 the disclosure of which is also hereby incorporated by reference, which claims priority to U.S. Provisional Application Ser. No. 60/533,128 filed Dec. 30, 2003, and is a continuation-in-part application of U.S. patent application Ser. No. 10/979,350 filed Nov. 2, 2004 the disclosure of which is also hereby incorporated by reference, which claims priority to U.S. Provisional Application Ser. No. 60/533,127 filed Dec. 30, 2003.

BACKGROUND OF THE INVENTION

The invention generally relates to optical switching systems, and particularly relates to wavelength selective optical switching systems and broadband optical switches as well as variable optical channel attenuators.

Optical switches typically involve two or more waveguides that may be selectively brought into close proximity with one another. For example, U.S. Pat. No. 6,839,479 discloses an optical switch that includes a waveguide (having both a core and cladding) mounted on support structures or posts, wherein the waveguide may be selectively deflected toward another waveguide by the application of an electric charge to the waveguide, which includes a doped single crystal silicon conducting element with an electron carrier concentration of $10^{16}$ cm$^{-3}$.

Wavelength selective optical switches typically involve the use of either a ring resonator or a sphere to selectively transfer signals having the selected wavelength from one waveguide to another. For example, U.S. Pat. Nos. 6,665,476 and 6,718,083 disclose wavelength selective switches and routers that include ring or sphere resonators.

A need remains, however, for optical switches and wavelength selective optical switches that provide low-voltage requirements, fast actuation speed, low power, greater reliability, lower optical losses, the ability to be microfabricated (i.e., integrated into a single chip), and compatibility with a variety of material systems including CMOS.

There is a need therefore, for an improved optical switch that is relatively inexpensive to produce yet provides efficient switching of optical signals.

SUMMARY

The invention provides a switching system for an optical signal in accordance with an embodiment. The switching system includes a first optical communication channel coupled to a first electrode, a second electrode, and a second optical communication channel. The second optical communication channel is coupled to a movable electrode. The movable electrode is supported by a support structure and is positioned with respect to the first and second electrodes so that the position of the movable electrode may be selectively placed in either a first closed state or a second open state defined by the first and second electrodes under application of a voltage with respect to one of the first and second electrodes. The first closed state provides that the first and second optical communication channels are sufficiently close to each other to provide optical coupling therebetween while the second open state provides that the first and second optical communication channels are not sufficiently close to each other to provide optical coupling therebetween.

BRIEF DESCRIPTION OF THE DRAWING

The following description may be further understood with reference to the accompanying drawings in which:

FIGS. 1A and 1B show illustrative diagrammatic views of an integrated broadband optical switch in accordance with an embodiment of the invention in open and closed positions respectively;

FIGS. 2A and 2B show illustrative diagrammatic views of an integrated wavelength selective optical switch in accordance with another embodiment of the invention in open and closed positions respectively;

FIG. 7 shows an illustrative diagrammatic view of a plurality of optical switches in accordance with an embodiment of the invention being used in a variable optical attenuator system.

Figure 3A:
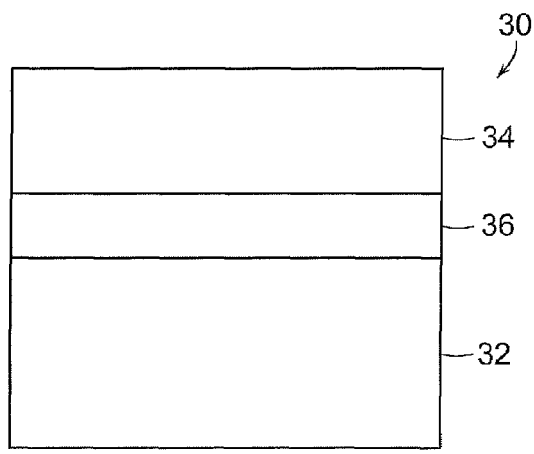
FIGS. 3A-3G show illustrative schematic views of one possible approach in fabricating an optical switch in accordance with an embodiment of the invention.

The drawings are shown for illustrative purposes only and are not necessarily to scale.

DETAILED DESCRIPTION OF THE ILLUSTRATED EMBODIMENTS

The invention provides for a variety of optical devices to be formed as integrated optical circuits including wavelength selective switches, broadband switches, and variable optical attenuators. Benefits of these devices compared to other devices include compatibility with a number of material systems including CMOS, low-voltage requirements, fast actuation speed, low power, greater reliability, and lower optical losses.

Devices in accordance with various embodiments of the invention may be used as fundamental building blocks to create integrated optical circuits for a variety of purposes. In an optical integrated circuit a variety of optical devices are brought together into one monolithic chip to decrease cost and increase functionality. Optical integrated circuits can be used for applications including optical networking for telecommunications, data interconnects for computers, or optical computing. Illustrated examples of such devices disclosed herein include a wavelength selective switch, a broadband switch, and a variable optical attenuator.

The broadband switch is based on switching the coupling between two waveguides. In one position, the waveguides are decoupled and the light remains in the same waveguide. In the second position, the waveguides are coupled and the light is transferred from one waveguide to the other. A schematic representation of the operation of this switch is shown in FIGS. 1A and 1B. For example, light of wavelengths $\lambda_1$, $\lambda_2$, $\lambda_3$ may be input into one end of a first waveguide 12. A switching portion 14 may be pulled toward a second waveguide 10 along a length L as shown in FIG. 1B. Light from the first waveguide 12 is transferred to the second waveguide 10 through evanescent coupling between the waveguides. In various embodiments, some light may remain in the first waveguide 12, while some light is transferred to the second waveguide 10. In FIGS. 1A and 1B, light is only input into one of the four waveguide ends, however; light could be input into any of the four ends. Regardless of the input point, if the waveguides are coupled, the light will shift to the other waveguide. If the waveguides are decoupled the light will remain in the original waveguide only.

In this example, only one waveguide is shown to be moving, however, a variety of arrangements may be employed in which one or both waveguides include movable sections such as shown at 14. The distance L of the coupling region and the gap between the waveguides in the coupling region between the waveguides 10 and 12 determines (together with the indices of refraction of the waveguide materials) the amount of coupling between the waveguides. For example, while a length of coupling of, for example, about ½ micron may provide some transfer of optical signals, a length L of hundreds of microns may provide a transfer of substantially all of the signal from one waveguide to another. In accordance with further embodiments, there could also be a plurality of sections of the waveguides on top of switch structures to give greater control over the coupling. The gap across which the evanescent coupling may occur could be between 0 to 5 microns, and preferably is about 0.05-3 microns.

The waveguide core may be formed of a material, such as a silicon rich silicon nitride material that has an index of refraction of about 1.75 to about 2.5, and is preferably about 2.0. The waveguide cladding needs to be a material with a lower optical index and may be a combination of air (index of 1.0) and a supporting material. The switch may be formed using a semiconductor chip manufacturing technique such as described below, and the movable portion may be controlled using the actuation technique described below. Using this actuation technique provides advantages such as fast switching speed, low actuation voltage, CMOS compatibility (in terms of materials, processes, and actuation voltages), improved reliability, and low operating power.

As shown in FIGS. 2A and 2B, a wavelength selective switch in accordance with another embodiment of the invention may use an optical ring resonator filter 28 to provide the wavelength selective coupling between waveguides 20 and 24 at portions 22 and 26 thereof respectively. As shown in FIG. 2B, the ring resonator filter 28 may be designed to provide that signals having a wavelength $\lambda_2$ positively interfere in the ring resonator and negatively interfere in the input waveguide such that $\lambda_2$ is coupled from waveguide 24 to waveguide 20. Again the amount of coupling may range, for example from about 1% to close to 100% depending on the length and coupling gap between portions 26 and 22 and the filter 28 for the state in which the filter 28 and waveguide sections 26 and 22 are in close proximity. The amount of coupling is also dependent on the amount of optical loss in the ring. In one position, the waveguides are close enough to the ring resonator to couple light into the ring. In the other position, the waveguides no longer couple light into the ring resonator. The input and output waveguides 24, 20 are built on top of micro-electro-mechanical systems (MEMS) switch structures that move the waveguides into two different positions.

The broadband switch may be fabricated as shown, for example, in FIGS. 3A-3G as discussed further below. The wavelength selective switch may be fabricated using essentially the same process.

The electro-mechanical micro-switch device of the invention provides basic mechanical switch functionality, that is, the position of the moving portion of the structure can be selectively placed in one of two states. The switch predominantly uses stored elastic potential energy for switching both directions, i.e., on and off. An exemplary embodiment of a switch-structure includes a fixed bottom electrode, a movable middle electrode, and a fixed top electrode. The movable middle electrode may be switched from being pulled-in to the bottom electrode to being pulled-in to the top electrode, and vice-versa. A third equilibrium position for the middle electrode may exist between the top and bottom electrodes, and this position could potentially be used for a three way switch. The bottom electrode is formed on the substrate material, and the top electrode is supported by a thick layer of a supporting material (e.g., silicon oxide) so it does not move. Electrically isolating layers comprised of a non-conducting material are necessary in between the movable electrode and the first and second fixed electrodes. Typically this would be a material such as silicon oxide or silicon nitride but in some implementations this could also be a free-space gap that is achieved due to the geometry of the switching structure.

Although the switch predominantly uses stored elastic potential energy for switching, the trigger for the switch utilizes electrostatics. The idea of electrostatic actuation has been used in many MEMS applications. The switch of the invention uses electrostatic force in a new way to selectively hold and release the structure. The voltage required for this operation is less than the typical electrostatic pull-in voltage of the device and can be as low as the hold voltage of the device.

Standard MEMS electrostatic actuators, which have been used in a wide variety of applications, have a minimum voltage required to achieve a state where the movable MEMS structure is pulled in to the stops or dielectric material separating the movable electrode from the fixed electrode. This minimum voltage to achieve the pulled-in state is called the pull-in voltage. To release the movable electrode from the pulled-in state, the voltage needs to be lowered to a point where the elastic restoring force overcomes the electrostatic force at which point the movable electrode will pop off of the mechanical stops or the dielectric material. This voltage is called the hold voltage, which is lower than the pull-in voltage.

The hold voltage can be reduced by decreasing the thickness of the dielectric material between the electrodes, the smaller the gap, the smaller the voltage needed to hold the MEMS structure in the pulled-in state. Hold voltages can be less than 5% of the pull-in voltage. Since the actuation technique used for this invention only operates at the hold voltage, the stiffness of the structure can be increased dramatically. This leads to a higher resonant frequency and a faster switching speed at lower voltages than can be achieved with standard electrostatic actuation.

For optimal operation, where virtually all of the energy for switching comes from the stored elastic potential energy, energy needs to be conserved in the system. This means that the energy lost to damping needs to be minimized. To achieve the low damping (or high Q) needed for the switch, it may be necessary to operate the device in a vacuum. Q values for MEMS structures can be very high, up to 100,000 or more. A Q value of about 5, or possibly even less, should be adequate for the switch to operate according to this actuation technique, although a higher value will allow the switch to be more power efficient and have a lower operating voltage.

For the switch to work there needs to be stored elastic potential energy in the structure. This elastic potential energy needs to be introduced prior to the normal operation of the switch. This energy could be introduced by applying a large initial "setting" voltage that exceeds the pull-in voltage of the structure. Another option, which would be slower but would allow for the initial pull-in of the structure with a voltage lower than the pull-in voltage, is to apply a voltage signal to the electrodes that is modulated at the resonant frequency of the structure. As long as the energy being input with each cycle is more than that being dissipated through damping, the structure will increase its amplitude of oscillation until it is close enough to the electrode to be pulled-in by the lower voltage, as described in co-pending U.S. patent application Ser. No. 10/979,350 filed Nov. 2, 2004, the disclosure of which is hereby incorporated by reference.

The standard methods to provide switching actuation for micro-mechanical switches are electrostatic, piezoelectric, thermal (with a bi-material structure or shape memory materials), or magnetic. Thermal and magnetic actuation requires a significant current to flow for the actuation to take place. This leads to much higher energy consumption per switch cycle than electrostatic and piezoelectric switches, which have very low current. The electrostatic and piezoelectric switches still have some energy consumption since elastic potential energy is stored in the structure every time a voltage is applied. This energy is then dissipated when the switch is turned off (or released). The inventive switch should require less energy per switch operation than any of the current MEMS switches, since the energy for the actuation comes predominantly from the stored elastic potential energy. Very little of this energy is dissipated with each switch cycle. The small amount of dissipated energy is replaced by a small amount of energy injected due to the electrostatic hold voltage. This lower energy requirement should lead to a switch that requires less power to operate (for switches with comparable switching speeds).

The voltage requirements for all of these switching techniques vary significantly from ~3V to 100V and higher. Depending on the application, variations of the switch described herein could have actuation voltages anywhere within this range. For a given set of switch characteristics (switching speed, size, power, restoring force, etc.) the switch being disclosed here should, in general, require a lower voltage than most other actuation techniques.

Figure 3B:
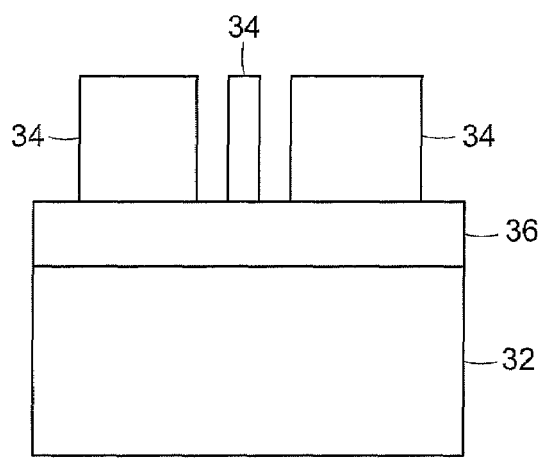
Figure 3C:
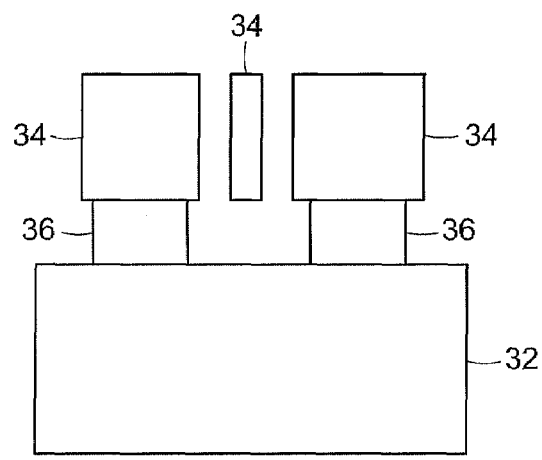
Figure 3D:
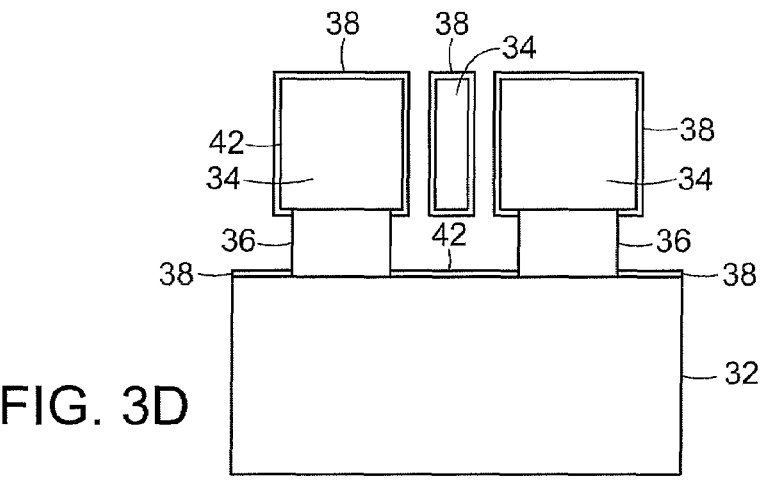
Figure 3E:
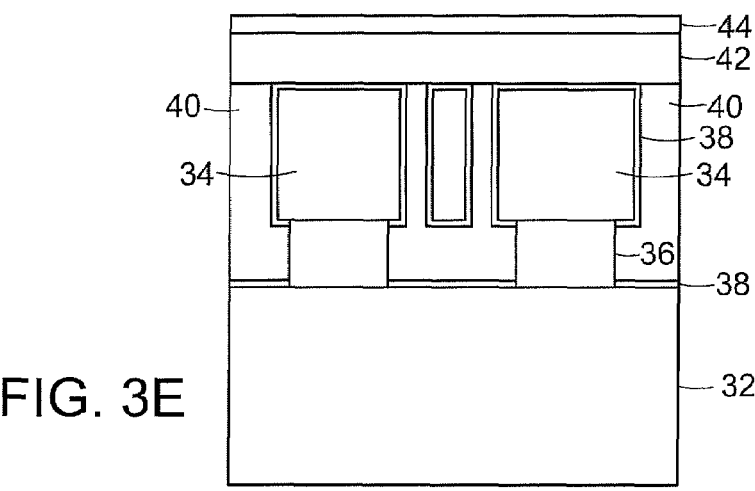
Figure 3F:
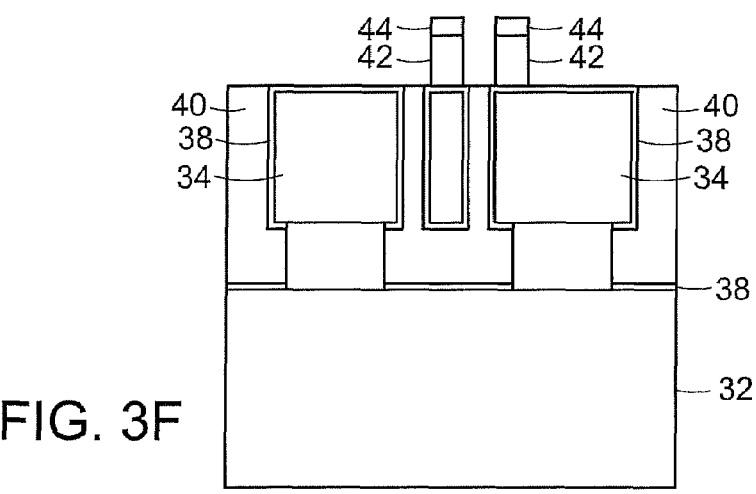
Figure 3G:
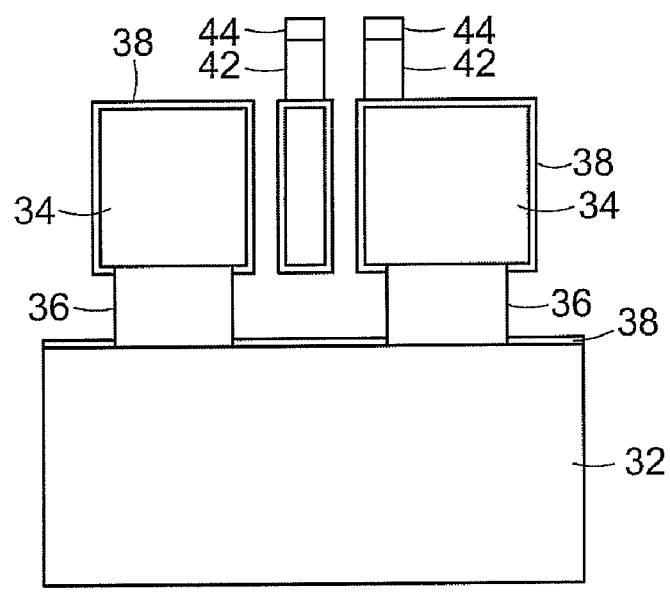

FIGS. 3A-3G show one possible approach to fabricating a micro-switch device that uses the switching technique described herein. The technique uses an SOI wafer 30 and makes use of the silicon device layer 34 and oxide layer 36, as shown in FIG. 3A, to form a movable electrode as well as the two fixed electrodes. The silicon handle layer 32 acts as a substrate for the switching structure to be anchored to. In this particular implementation, the movable electrode would move side to side rather than up and down relative to the substrate. FIG. 3B shows layer 34 being patterned and etched using standard lithography techniques and an anisotropic etch, such as RIE. FIG. 3C shows layer 36 being isotropically removed from underneath the movable electrode. FIG. 3D shows a conformal dielectric layer 38 being deposited or grown: this may be thermal silicon oxide being grown. FIG. 3E shows a sacrificial fill material 40 being deposited. This fill material 40 needs to be a substrate that will etch selectively compared with the other materials present and could be PSG or a polymer. FIG. 3E also shows the waveguide cladding material 42, which may be silicon oxide, being deposited followed by the waveguide core material 44, which may be silicon nitride. FIG. 3F shows the waveguide core material 44 and cladding material 42 being patterned by lithography techniques and then anisotropically etched. FIG. 3G shows the sacrificial fill material 40 being removed. Prior to the removal of the sacrificial material 40, bond pads and vias to the silicon MEMS structure can be formed using standard techniques to allow the electrical connectivity to the MEMS structure. The bond pads would be relatively far away from the MEMS structure and optical waveguides (and hence are not shown in FIGS. 3A-3G).

This fabrication technique offers several advantages. First the number of mask steps is reduced as compared with a typical up and down or torsional switch. Also, the silicon device layer has very low, if any, residual stress and a very low dislocation density. Both characteristics add to the performance and reliability of the device. Also, silicon and silicon dioxide are used for the movable electrode structure. Both of these materials have very high failure strengths, allowing for very fast switch operation. The silicon dioxide is also resistant to fatigue failure and dielectric charging, as compared to other common dielectric materials such as silicon nitride.

One last advantage is that the fixed electrodes can be curved to match the fundamental mode shape of the movable electrode. This is desirable because it should allow lower actuation voltages as well as direct the stored elastic potential energy into the lowest resonant mode of the device rather than exciting higher modes, which would detract from the switching action.

Figure 4:
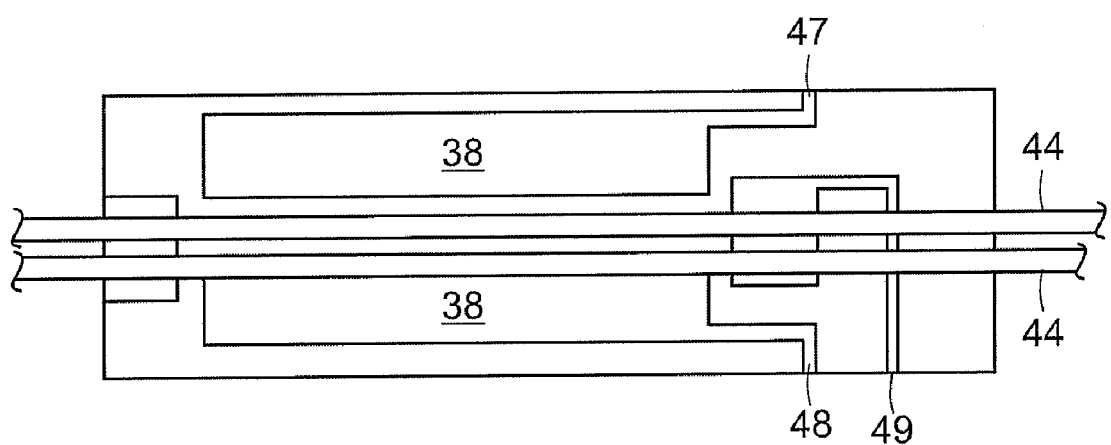
FIG. 4 shows an illustrative diagrammatic top view of the structure as shown in FIG. 3G.

FIG. 4 shows a top view of the structure shown in FIG. 3G in which the waveguides (including the core material 44) are shown extending from either end of the structure. The structure also includes electrical contacts 47, 48 and 49 through which an electric potential may be applied to the electrode material 34 underlying the exposed dielectric layer 38. The air or vacuum on the top and sides of each core material may act as a sufficient cladding that additional cladding material may not be required on these surfaces of the core material.

Figure 5:
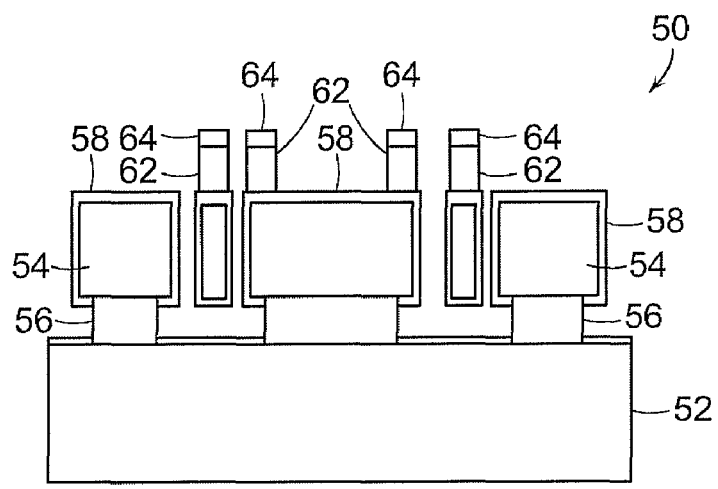
FIG. 5 shows an illustrative diagrammatic side view similar to that shown in FIG. 3G of another structure in accordance with a further embodiment of the invention.
Figure 6:
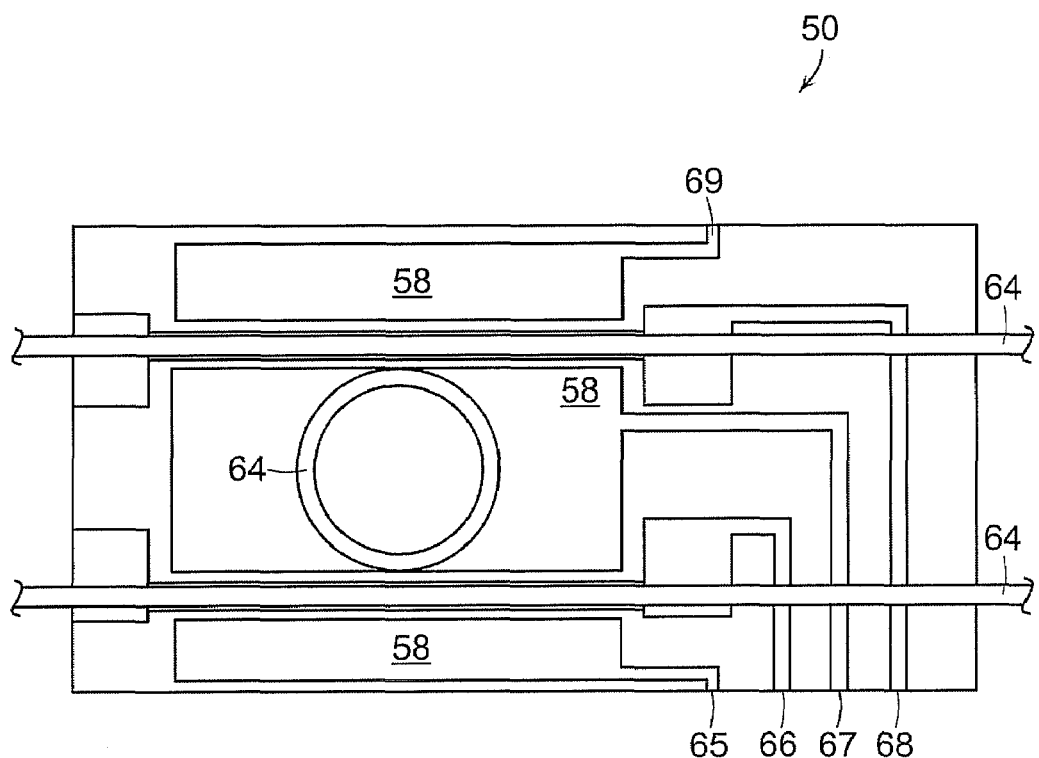
FIG. 6 shows an illustrative diagrammatic top view of the structure shown in FIG. 5.

FIGS. 5 and 6 show side and top views of a wavelength selective switch structure 50 in which two waveguides and one ring resonator filter are mounted on electrodes 54. In particular, each of the waveguides and the ring resonator filter includes a core material 64 and a cladding material 62 mounted on an oxide layer 58 on electrodes 54, that are supported by a silicon device layer 54 on a silicon handle layer 52. Contacts 65, 66, 67, 68, and 69 may be used to actuate the switches as discussed above. Again, the two waveguides may be each selectively brought closer into proximity with the ring resonator filter, or may be selectively moved further away from the ring resonator filter. Although the ring resonator is shown as a single ring, higher order ring resonators could just as easily be used to create better shape pass bands for the filter. Switching may also be achieved by simply switching the input waveguide away from the ring resonator filter rather than both waveguides. However, if light is input from more than one waveguide end, such as would be the case with an add/drop multiplexer using these wavelength selective switches, both waveguides would need to be switched.

In accordance with a further embodiment of the invention, a variable optical attenuator may be fabricated. In optical networks, the intensity of different channels (wavelengths) in a wavelength division multiplexed (WDM) signal often varies due to wavelength dependent amplification, different sources, different paths, or wavelength dependent loss. Because of this variability in intensity of channels, there is a need to rebalance the intensity of the different channels in a fiber. Variable optical attenuators provide that capability.

FIG. 7 shows a variable optical attenuator in accordance with an embodiment of the invention that includes a plurality of switches 70, 72, 74. Switch 70 receives an input signal along waveguide 78, and partially couples a channel within that signal to an output waveguide 80 via a ring resonator filter 76. Switch 72 receives an input signal along waveguide 84, and partially couples a channel within that signal to an output waveguide 86 via a ring resonator filter 82, and switch 74 receives an input signal along waveguide 90, and partially couples a channel within that signal to an output waveguide 92 via a ring resonator filter 88. The selectively attenuated output is provided at 94. This device uses a digital approach for attenuation where different amounts of attenuation are introduced by a series of switched attenuators that operate on the same channel. The attenuator system make use of a series of optical ring resonators to allow independent attenuation of the different channels. The structure of the switched attenuators could be similar to the structure of the wavelength selective switch shown in FIGS. 5 and 6. The number of attenuators that operate on a particular channel provides the granularity of attenuation for that channel. For example, if three independently controllable attenuators are used, eight different levels of attenuation may be achieved. By using larger numbers of attenuators, the granularity of the attenuation may be reduced significantly.

The amount of attenuation provided by each individual attenuator may be controlled by the quality factor of the ring resonator filter. The quality factor may be modified by either changing the amount of optical loss in the ring itself, or by changing the coupling between the input and drop waveguides and the ring resonator. Also, depending on the shape of the filter response, a number of channels could be attenuated all at once, or separate variable optical attenuator devices could be used for each individual channel. Like the broadband and wavelength selective switch devices, this structure would utilize the switching mechanism discussed above.

There are a number of advantages provided by these devices. Currently, the functionality provided by these structures is achieved commercially by large, expensive, and non-integrated systems. These devices are all meant to be integrated to create a highly functional and inexpensive optical integrated circuit. These cost and functionality benefits can't be replicated by non-integrated systems.

There have been a number of broadband switches designed and developed. They are based on a number of mechanisms including thermo-optic, electro-optic, and MEMS. The disclosed integrated broadband switch combines fast switching speed, low actuation voltage, high reliability, low optical loss, CMOS (and other material systems) compatibility, and very low operating power.

The variable optical attenuator disclosed herein provides an important functionality in optical networking. This is a significantly less expensive and faster implementation of a process that is usually either done through optical to electrical to optical conversions (OEO) or with large non-integrated optical systems. This device would provide the necessary rebalancing of the optical channels in an integrated platform which would lead to savings in system cost, space, and power consumption. The attenuation could also be switched between levels much faster than the systems that are currently used to control the optical intensity of channels.

Commercial applications for these devices would be in any area where integrated optical circuits may be used including, for example, optical networking, optical interconnects for computing, optical computing, phased array radar systems, and biological sensing.

Those skilled in the art will appreciate that numerous modifications and variations may be made to the above disclosed embodiments without departing from the spirit and scope of the invention.

What is claimed is:

1. A switching system for an optical signal, said switching system comprising:
   a first optical waveguide coupled to a first electrode;
   a second electrode;
   a second optical waveguide coupled to a movable electrode, said movable electrode being supported by a support structure and being positioned with respect to said first and second electrodes so that the position of the movable electrode may be selectively placed in either a first closed state or a second open state defined by the first and second electrodes under application of a voltage with respect to one of the first and second electrodes, said first closed state providing that said first and second optical waveguides are sufficiently close to each other to provide some amount of optical coupling therebetween while said second open state providing that the first and second optical communication channels are at a different proximity than in the first closed state and provide a different amount of optical coupling therebetween, said first optical waveguide and said second optical waveguide having a core material and a cladding material mounted on an oxide layer on said movable electrode and at least one of said first and second electrodes; and
   a silicon handle layer acting as a substrate to which the switching system is anchored.

2. The switching system as claimed in claim 1, wherein said switching system further includes an optical ring resonator interposed between said first and second optical waveguides such that said first and second optical waveguides are sufficiently close to the optical ring resonator to provide some amount of optical coupling via said ring resonator while in the closed state. In the second open state, the proximity of the waveguides to the ring resonator is different and provides a different amount of optical coupling.

3. The switching system as claimed in claim 2, wherein said switching system provides wavelength selective switching of optical signals within one of said first and second optical waveguides.

4. The switching system as claimed in claim 1, wherein said switch provides broadband coupling of signals between the first and second optical waveguides.

5. The switching system as claimed in claim 1, wherein said switch is employed in a variable optical attenuator.

6. The switching system as claimed in claim 1, wherein said first closed state provides that said first and second optical waveguides are within about 5 microns of one another.

7. The switching system as claimed in claim 6, wherein said first closed state provides that said first and second optical waveguides are within about 3 microns of one another.

8. The switching system as claimed in claim 1, wherein said first closed state provides that said first and second optical waveguide are within about 5 microns of one another for a distance along said first optical waveguide of between about ½ micron and about 500 microns.

9. A switching system for an optical signal, said switching system comprising:
   a first optical waveguide;
   a ring resonator filter;
   a second optical waveguide coupled to a movable electrode; said movable electrode being supported by a support structure and being positioned with respect to a first electrode and a second electrodes so that the position of the movable electrode may be selectively placed in either a first closed state or a second open state defined by the first and second electrodes under application of a voltage with respect to one of the first and second electrodes, said first closed state providing that said ring resonator filter and second optical waveguides are sufficiently close to each other to provide some amount of optical coupling therebetween while said second open state providing that the ring resonator filer and second optical waveguides are at a different proximity to each other to provide a different amount of optical coupling therebetween, said first optical waveguide and said second optical waveguide having a core material and a cladding material mounted on an oxide layer on said movable electrode and at least one of said first and second electrodes; and a silicon handle layer acting as a substrate to which the switching system is anchored.

* * * * *